United States Patent [19]

Duprez et al.

[11] 4,134,543

[45] Jan. 16, 1979

[54] SNAP ACTION THERMALLY RESPONSIVE FLUID CONTROL VALVE

[75] Inventors: Wayne R. Duprez, West Newton; George J. Briand, Winthrop, both of Mass.

[73] Assignee: Standard-Thomson Corporation, Waltham, Mass.

[21] Appl. No.: 751,446

[22] Filed: Dec. 16, 1976

[51] Int. Cl.² ............................................. G05D 23/10
[52] U.S. Cl. ..................................... 236/48 R; 236/86; 137/625.69
[58] Field of Search ................... 236/86, 87, 35, 48 R; 251/75; 137/625.65, 625.69

[56] References Cited

U.S. PATENT DOCUMENTS

| 3,388,861 | 6/1968 | Harding | 236/12 R |
| 3,955,760 | 5/1976 | Ridenour et al. | 236/86 |

Primary Examiner—William E. Wayner
Attorney, Agent, or Firm—Jacox & Meckstroth

[57] ABSTRACT

A snap action fluid control valve, the operation of which is controlled by a relatively slow acting thermally responsive actuator member. The valve of this invention is particularly adapted for use in controlling flow of fluid to a fluid operable clutch or the like for operation thereof. The thermally responsive actuator portion of the valve senses temperature of a fluid, the temperature of which is responsive to operation of a fan which is operated through the clutch.

7 Claims, 11 Drawing Figures

SNAP ACTION THERMALLY RESPONSIVE FLUID CONTROL VALVE

BACKGROUND OF THE INVENTION

It is highly desirable that a clutch have snap action in the clutching and declutching operation thereof, in order to reduce clutch slippage and to decrease clutch lining wear. The fluid control valve of this invention is particularly adapted for controlling flow of air to an air operated clutch, but is also applicable to other types of apparatus. When the thermally responsive fluid control valve of this invention is employed with a fluid operable clutch, the clutch operates a fan in an internal combustion engine cooling system. The fan forces air through a radiator or heat exchanger which is a part of the cooling system for the internal combustion engine. The valve is operated by a thermally responsive actuator which senses the temperature of a liquid flowing through the internal combustion engine for the cooling thereof.

It is necessary to employ a thermally responsive actuator which is capable of performing a significant amount of work required for operation of the valve. Such a thermally responsive actuator is ordinarily one which employs a thermally responsive expansible material for creating relative movement between a container of the material and an actuator rod. Such a thermally responsive actuator is, by nature, relatively slow in operation. Therefore, conventional thermally responsive fluid control valves which control fluid flow to a fluid operable clutch have caused the fluid operable clutch to operate slowly. As stated above, slow operation in clutching and declutching is objectionable.

It is an object of this invention to provide a fluid control valve device which includes a thermally responsive actuator and in which the fluid control valve has snap action, for operation of any one of numerous types of mechanisms, such as a fluid operable clutch.

Another object of this invention is to provide such a thermally responsive fluid control valve device which may be constructed for fluid flow therethrough in response to elevated temperatures and which may be constructed for prevention of fluid flow therethrough in response to elevated temperatures.

It is another object of this invention to provide such a thermally responsive fluid control valve device which can be used in any one of numerous types of applications, other than in the areas of internal combustion engines and automotive situations.

Other objects and advantages of this invention reside in the construction of parts thereof, the combination thereof, the method of manufacture, and the mode of operation, as will become more apparent from the following description.

SUMMARY OF THE INVENTION

A thermally responsive fluid control valve device of this invention comprises a housing provided with an inlet passage, an outlet passage, and at least one vent passage. All of the passages lead to an internal chamber or main passage in the housing. Within the internal chamber or main passage are a plurality of pistons or movable valve members which control flow of fluid between passages. One of the movable valve members is moved by a thermally responsive actuator, and movement thereof forces movement of a second movable valve member. The second movable valve member is movable to another position by fluid flowing between the first and second valve members. Thus, the fluid which is controlled by the valve of this invention is fluid which creates snap action movement of the second movable valve member for control of flow of the fluid between passages which are in communication with the main passage.

DETAILED DESCRIPTION OF THE PREFERRED EMBODIMENTS

Figure 1:
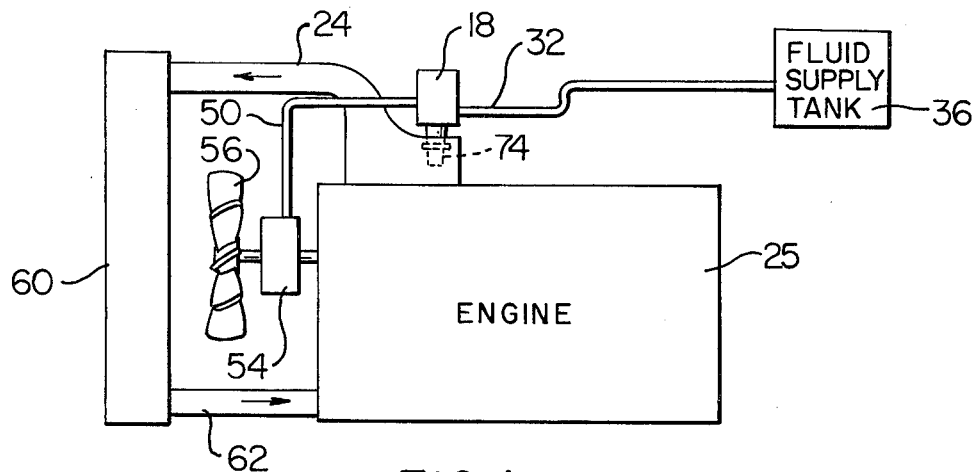
FIG. 1 is a diagrammatic view of a typical system within which a thermally responsive fluid control valve device of this invention may operate.

A thermally responsive fluid control valve device 18 of this invention as shown in FIGS. 2-6 comprises a housing 20 having a threaded end portion 22, which is adapted to be attached to and extend into a portion of a fluid conduit 24, shown in FIG. 1. The fluid conduit 24 is part of a system within which fluid flows for cooling an internal combustion engine, such as an engine 25, shown in FIG. 1, or the like. Ordinarily the fluid flowing through the engine 25 is a liquid.

The housing 20 has an inlet passage 30, which is adapted to be joined to a source of air or other fluid under pressure. FIG. 1 shows a fluid conduit 32 joined to the inlet passage 30 of the housing 20. The fluid conduit 32 is joined to a fluid supply tank 36. The fluid supply tank 36 may, for example, contain air or other gas under suitable pressure.

The inlet passage 30 is in communication with a main passage or cavity 40 within the housing 20. Also in communication with the main passage or cavity 40 is an outlet passage 44, a vent passage 46 and a vent passage 48. The outlet passage 44 is adapted to be in communication with a fluid conduit, such as a fluid conduit 50 shown in FIG. 1 which extends from the fluid control valve device 18 to a fluid operable clutch 54. The clutch 54, when in clutch position, joins the engine 25 to a fan 56 for rotation of the fan 56 with operation of the engine 25. The fan 56 is adapted to cause flow of air through a heat exchanger or radiator 60. The fluid conduit 24 joins the engine 25 to the upper portion of the heat exchanger 60, and a fluid conduit 62 joins the lower portion of the heat exchanger 60 to the engine 25.

Within the main passage or cavity 40 of the housing 20 is a piston or movable valve member 70. The piston or movable valve member 70 is normally engaged by an actuator rod 72 of a thermally responsive actuator device 74. The thermally responsive actuator device 74 is attached to the housing 20 and extends into the main passage 40 through an opening in the housing 20 within which a portion of the thermally responsive actuator device 74 is located. The thermally responsive actuator device 74 has a portion thereof within the fluid conduit 24 and which is directly in contact with the fluid within the fluid conduit 24. The movable valve member 70 includes an encompassing elastomeric sealing member 78. The movable valve member 70 has a protuberance 80 which freely extends into a cavity 84 of a piston or movable valve member 86.

Within the cavity 84 of the movable valve member 86 is a ball 90 which is engaged by a spring 92. Elastomeric sealing members 98, 100 and 102 tightly encompass the movable valve member 86, as a part thereof. The movable valve member 86 has a reduced portion 103 between the elastomeric sealing members 100 and 102. A passage 104 within the movable valve member 86 leads to the cavity 84. An annular abutment member 110 is positioned within the main passage 40, adjacent an open end 40a thereof. A spring 108 within the main passage 40 engages the movable valve member 86 and the abutment member 110 and urges the movable valve member 86 toward the movable valve member 70.

OPERATION

Figure 2:
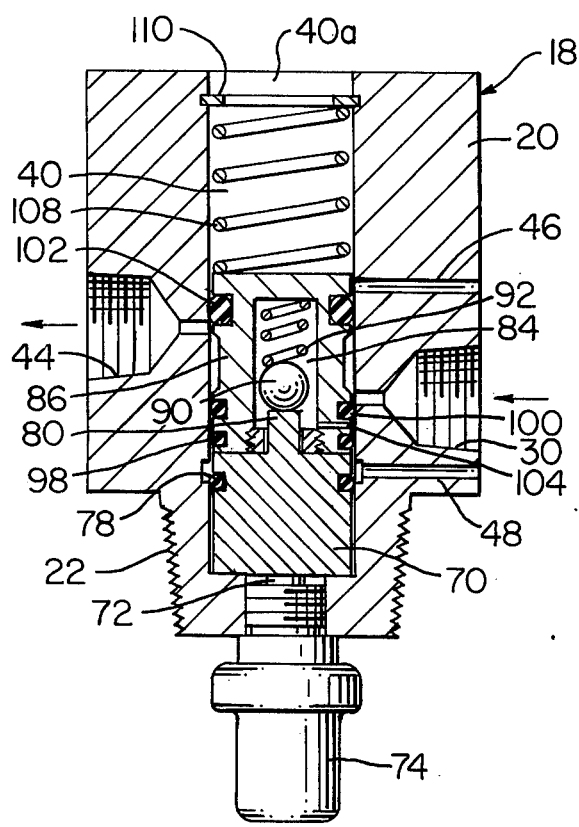
FIG. 2 is a sectional view of a thermally responsive fluid control valve device of this invention in a deactuated condition. This valve device is one in which flow of fluid therethrough is permitted when the valve device is in a deactuated condition.

The movable elements of the valve device 18 are positioned as illustrated in FIG. 2 when the temperature of the thermally responsive actuator 74 is less than a predetermined value. When the movable elements of the valve device 18 are so positioned, fluid entering the passage 30 of the valve device 18 from the fluid conduit 32 flows through the passage 30 into the main passage 40. Fluid then can flow around the reduced portion 103 of the movable valve member 86, through the main passage 40 and into the discharge passage 44. The fluid then flows through the discharge passage 44 into the fluid conduit 50 and to the fluid operable clutch 54. The fluid operable clutch 54 declutches the fan 56 from the engine 25 when fluid pressure is applied to the fluid operable clutch 54 through the fluid conduit 50.

Thus, the movable elements of the valve device 18 are positioned as shown in FIG. 2 when fluid flowing within the fluid conduit 24 from the engine 25 to the heat exchanger 60 is below a predetermined temperature. Under these conditions fluid transmitted through the valve device 18 applies pressure to the fluid operable clutch 54, and the fluid operable clutch 54 is in a declutched condition, so that the fan 56 does not rotate with operation of the engine 25.

Figure 3:
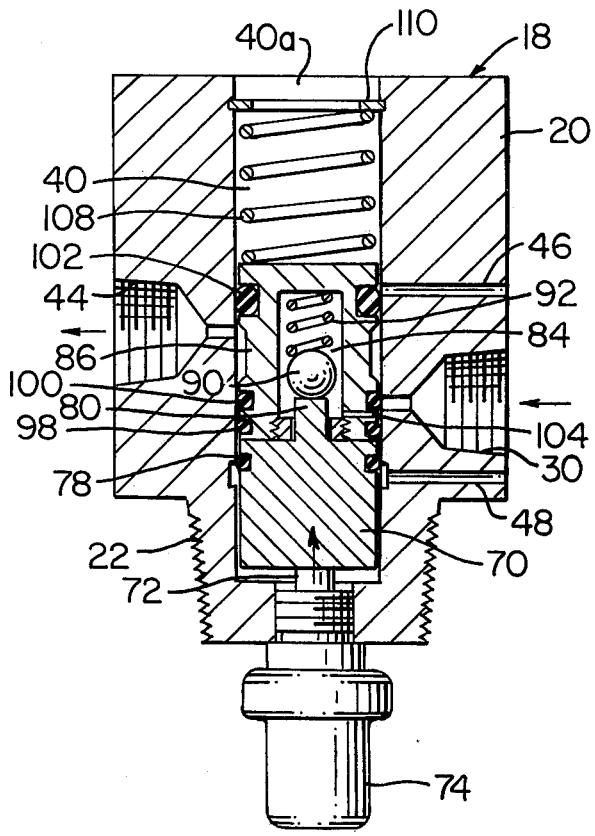
FIG. 3 is a sectional view similar to FIG. 2 but showing elements of the device in a position of operation.

When the temperature of the fluid flowing in the fluid conduit 24 increases above a predetermined value, the thermally responsive actuator device 74 begins to move the actuator rod 72 thereof toward the open end 40a of the main passage 40, and the movable valve member 70 is moved toward the open end 40a of the main passage 40, to a position as illustrated in FIG. 3. When the movable valve member 70 moves from the position thereof shown in FIG. 2 to the position thereof shown in FIG. 3, the movable valve member 70 moves the movable valve member 86, due to the fact that the movable valve member 86, as shown in FIGS. 2 and 3, is in engagement with the movable valve member 70.

When the movable valve member 86 is in the position thereof shown in FIG. 3, the elastomeric sealing member 100 of the movable valve member 86 is, at least partially, above the passage 30, so that fluid cannot flow from the passage 30 to the passage 44. The fluid pressure within the conduit 50 applied to the clutch 54 is maintained momentarily, but no pressure is applied to the fluid conduit 50 by fluid within the fluid conduit 32. With the movable valve member 86 positioned as shown in FIG. 3, the passage 104 of the movable valve member 86 is in communication with the inlet passage 30 of the housing 20. Thus, fluid from the inlet passage 30 flows into the passage 104 and flows into the cavity 84 of the movable valve member 86. Fluid then flows around the protuberance 80 to a position between the movable valve member 70 and the movable member 86. Thus, a flow passage exists from the inlet passage 30 to a position between the movable valve members 70 and 86.

Figure 4:
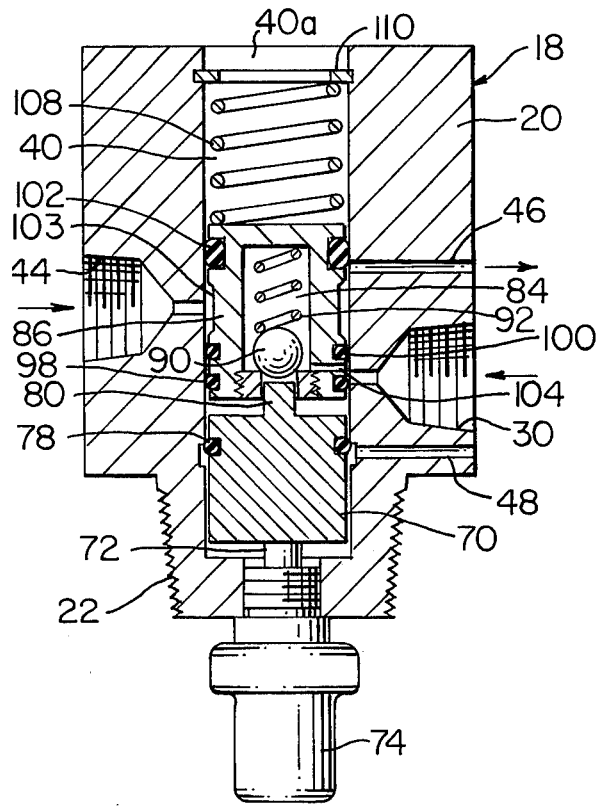
FIG. 4 is a sectional view similar to FIGS. 2 and 3 but showing elements of the device in another position of operation.

The fluid between the movable valve member 70 and the movable valve member 86 forces the movable valve member 86 in a direction away from the movable valve member 70, to a position as illustrated in FIG. 4. In this position of the movable valve member 86, the ball 90 seals against further flow of fluid from the cavity 84 to a position between the movable valve members 70 and 86. Thus, fluid pressure between the movable valve members 70 and 86 is maintained. With the movable valve member 86 so positioned, fluid can flow from the outlet passage 44 within the main passage 40, around the reduced portion 103 of the movable valve member 86, and into the vent passage 46, and to the atmosphere, as illustrated in FIG. 4. The movement of the movable valve member 86 from the position thereof shown in FIG. 3 to the position thereof shown in FIG. 4 is very rapid and in a snap action manner, because such movement results from fluid flow through the passage 104 and through the cavity 84 to a position between the movable valve members 70 and 86.

When the movable valve member 86 is positioned as shown in FIG. 4, fluid pressure from the clutch 54 and from the fluid conduit 50 is vented to the atmosphere. Thus, the clutch 54 very rapidly operates to a clutch condition, and the fan 56 is rotated with operation of the engine 25. Thus, the fan forces air to flow through the heat exchanger 60 and the fluid flowing within the heat exchanger 60 is cooled. Thus, the fluid flowing through the engine 25 is cooled.

Figure 5:
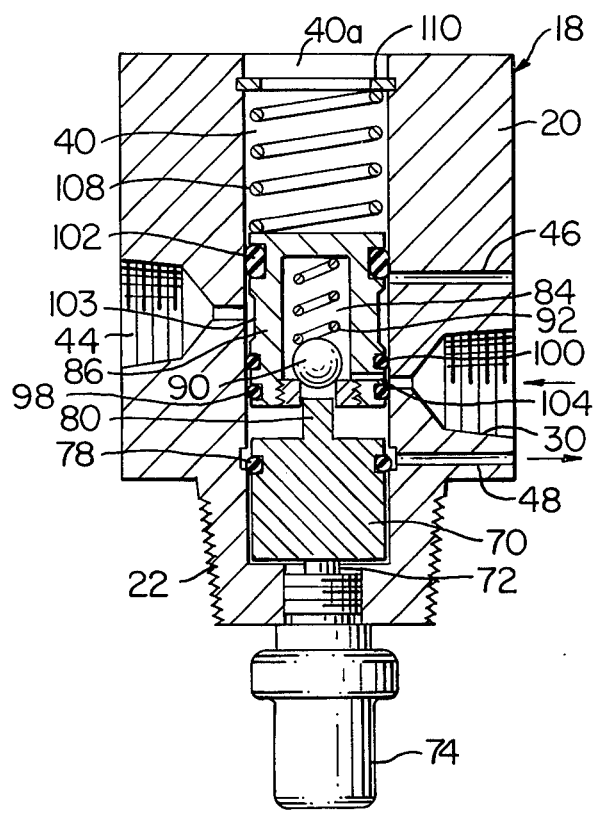
FIG. 5 is a sectional view similar to FIGS. 2, 3, and 4 but showing elements of the device in still another position of operation.
Figure 6:
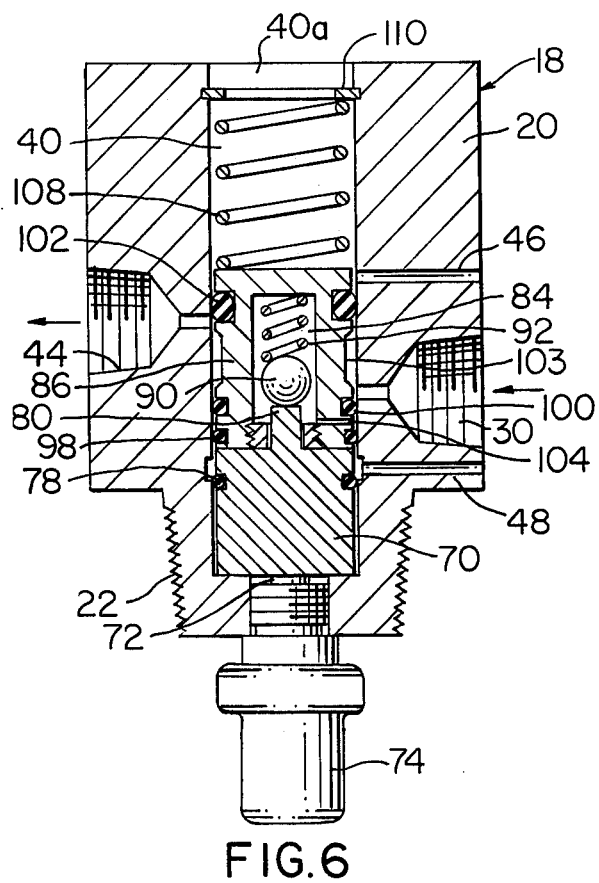
FIG. 6 is a sectional view similar to FIGS. 2-5 and showing the elements of the device returned to the same position as illustrated in FIG. 2.
Figure 7:
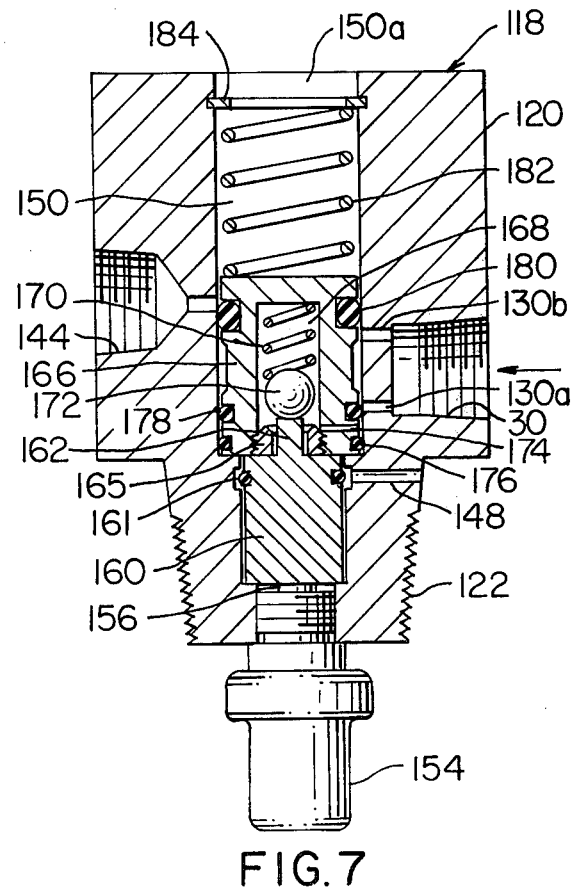
FIG. 7 is a sectional view illustrating another embodiment of the thermally responsive fluid control valve device of this invention in a deactuated condition. In this embodiment of the fluid control valve device flow of fluid therethrough is prevented when the device is in a deactuated condition.

When the temperature of fluid flowing from the engine 25 into the fluid conduit 24 is reduced in temperature to a predetermined value, the temperature sensed by the thermally responsive actuator 74 permits the actuator rod 72 thereof to move downwardly as shown in FIG. 5, and the movable valve member 70 moves downwardly therewith. However, the fluid trapped between the movable valve member 86 and the movable valve member 70 retains the movable valve member 86 in the position thereof shown in FIGS. 4 and 5. This position of the movable valve member 86 is maintained until the movable valve member 70 urged downwardly by the fluid between the valve members 86 and 70, reaches the position illustrated in FIG. 5 in which the vent passage 48 is opened. When the vent passage 48 is opened, fluid between the movable valve members 70 and 86 quickly flows to the atmosphere through the vent passage 48. Then the spring 108 is able to force the movable valve member 86 to move rapidly toward the movable valve member 70 and to a position in engagement therewith, as illustrated in FIG. 6. Due to the fact that the flow of fluid outwardly from the vent passage 48 occurs rapidly and due to the fact that the spring 108 forces the movable valve member 86 to move rapidly in snap action from the position thereof shown in FIG. 5 to the position thereof shown in FIG. 6, communication between the fluid conduit 32 and the fluid conduit 50 is re-established very rapidly. Thus, the clutch 54 is again caused to declutch very rapidly and in a snap action manner.

It is to be understood that the thermally responsive actuator member 74 moves the actuator rod 72 relatively slowly. However, even though operation of the thermally responsive actuator member 74 is relatively slow, the movement of the movable valve member 86 to positions for actuating and deactuating the clutch 54 is very rapid.

EMBODIMENT OF FIGS. 7–11

The embodiment of this invention as illustrated in FIGS. 7–11 is similar to the embodiment of FIGS. 2–6, but is constructed to prevent flow of fluid therethrough when the temperature of the thermally responsive actuator member thereof is below a predetermined value. Thus, a clutch such as the fluid operable clutch 54, associated therewith, for control of operation thereby, is one which is "clutched in" when fluid pressure is applied thereto for operation thereof.

In FIGS. 7–11 a thermally responsive fluid control vavle device 118 of this invention comprises a housing 120 having a threaded end portion 122 which is adapted to be attached to and extend into a portion of a fluid conduit 24. The housing 120 has a fluid inlet passage 130 which is adapted to be joined to a conduit such as the fluid conduit 32. The inlet passage 130 has two portions, 130a and 130b. The housing 120 also has an outlet passage 144 which is adapted to be joined to a fluid conduit, such as the fluid conduit 50. The housing 120 also has a vent passage 148. Within the housing 120 is a main passage 150 having an open end 150 a. A thermally responsive actuator member 154 has a sensing portion thereof outside the housing 120 and an actuator rod 156 extending into the main passage 150.

A movable valve member 160 within the main passage 150, is in engagement with the actuator rod 156. The movable valve member 160 has an encompassing elastomeric sealing member 161. The movable valve member 160 has a protuberance 162 which extends freely through an end wall 165 into a movable valve mbmer 166 thereof. The movable valve member 166 has a cavity 168 therein within which a spring 170 and a ball 172 are positioned. The movable valve member 166 has a passage 174 leading to the cavity 168 therein. The movable valve member 166 has encompassing elastomeric sealing members 176, 178 and 180. The movable valve member 166 is engaged by a spring 182 which engages an annular abutment member 184 which is retained within the main passage 150 adjacent the open end 150a thereof.

OPERATION OF THE VALVE DEVICE OF FIGS. 7–11

As stated above, the thermally responsive valve device of FIGS. 7–11 may be positioned in the conduit 24 to control operation of a clutch which is in a clutch-out condition in a deactuated condition. The valve device of FIGS. 7–11 is illustrated in a deactuated condition in FIG. 7. The movable valve member 166 is positioned so that fluid entering the housing 120 through the passage 130 flows into the main passage 150 through the passages 130a and 130b. However, the sealing members 178 and 180 prevent flow of fluid from the main passage 150.

Figure 8:
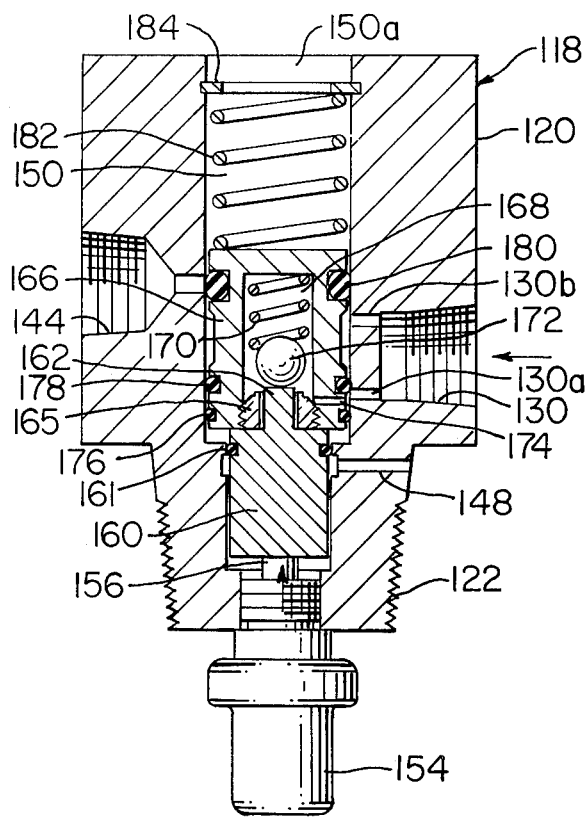
FIG. 8 is a sectional view, similar to FIG. 7, showing elements of the device in a position of operation.

When the thermally responsive actuator 154 is subjected to increasing temperatures of a predetermined value, the actuator rod 156 of the thermally responsive actuator 154 begins to move toward the open end 150a of the main passage 150, as illustrated in FIG. 8. When this movement of the actuator rod 156 occurs, the movable valve member 160 is moved by the actuator rod 156 toward the open end 150a, and, in turn, the valve member 160 moves the valve member 166 toward the open end 150a of the main passage 150.

In the position of the movable valve member 166 illustrated in FIG. 8, the passage 174 of the movable valve member 166 is in communication with the inlet passage 130b. Thus, fluid flows through the passage 174 into the cavity 168 and from the cavity 168, the fluid flows past the protuberance 162 and to a position between the movable valve members 160 and 166. The moment this occurs, the movable valve member 166 is forced rapidly in a direction from the movable valve member 160 to the position thereof illustrated in FIG. 9. The movable valve member 166 moves in a direction from the movable valve member 160 under the influence of fluid pressure between the movable valve members 160 and 166 until the ball 172 moves from engagement with the protuberance 162 into engagement with the end wall 165 of the valve member 166. When the ball 172 engages the end wall 165, fluid flow between the cavity 168 and the space between the valve members 166 and 160 ceases, and the position of the movable valve member 166 with respect to the movable valve member 160 remains fixed, under pressure applied by the fluid trapped between the movable valve members 160 and 166.

Figure 9:
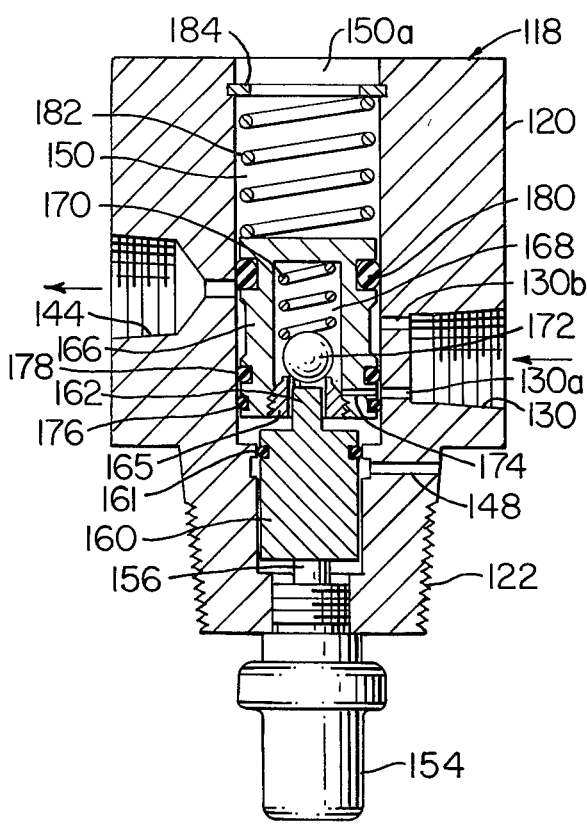
FIG. 9 is a sectional view, similar to FIGS. 7 and 8, showing elements of the device in another position of operation.

When the movable valve member 166 is so positioned, as illustrated in FIG. 9, fluid flows from the inlet passage 130a, through the main passage 150, and into the outlet passage 144. Then the fluid flows to a fluid operable mechanism, such as a fluid operable clutch for operation thereof. Due to the fact that the movable valve member 166 moves to its position shown in FIG. 9 in a snap action manner, a fluid operable mechanism controlld by the valve device 118, is actuated in a snap action manner.

Figure 10:
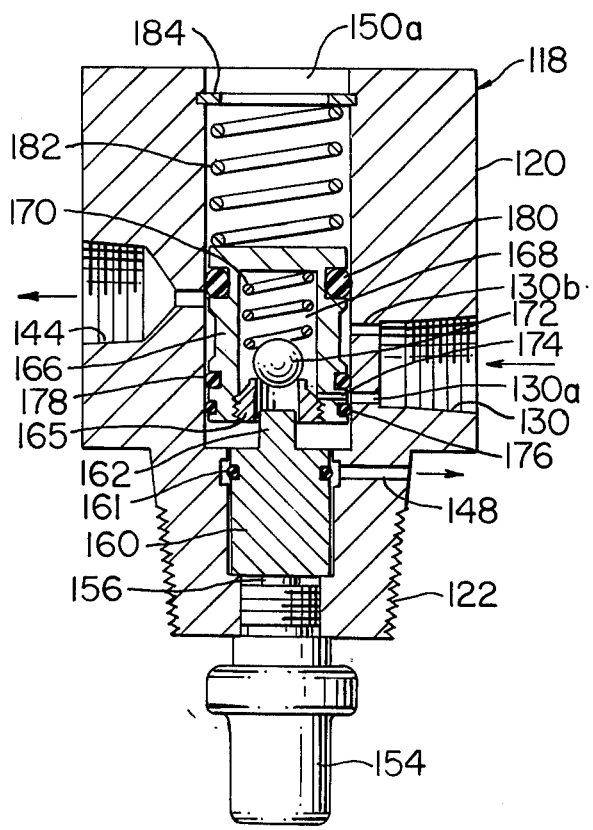
FIG. 10 is a sectional view, similar to FIGS. 7, 8 and 9, showing the elements of the device in still another position of operation.

When the temperature to which the thermally responsive actuator 154 is subjected is reduced to a predetermined value, the actuator rod 156 is permitted to move downwardly to the position thereof shown in FIG. 10. With downward movement of the actuator rod 156, the movable valve member 160 is moved downwardly under the influence of the fluid between the valve members 160 and 166. The valve member 160 moves downwardly under the influence of fluid between the valve members 160 and 166 until the seal member 161 of the valve member 160 is moved to a position to permit fluid to flow outwardly from the main passage 150, through the vent passage 148, as illustrated in FIG. 10. At the moment communication to the vent passage 148 occurs, fluid flows from its position between the movable valve members 160 and 166, and the movable valve member 166 is moved rapidly from the position thereof shown in FIG. 10 to the position thereof shown in FIG. 11. Such movement of the movable valve member 166 is under the influence of the spring 182.

Figure 11:
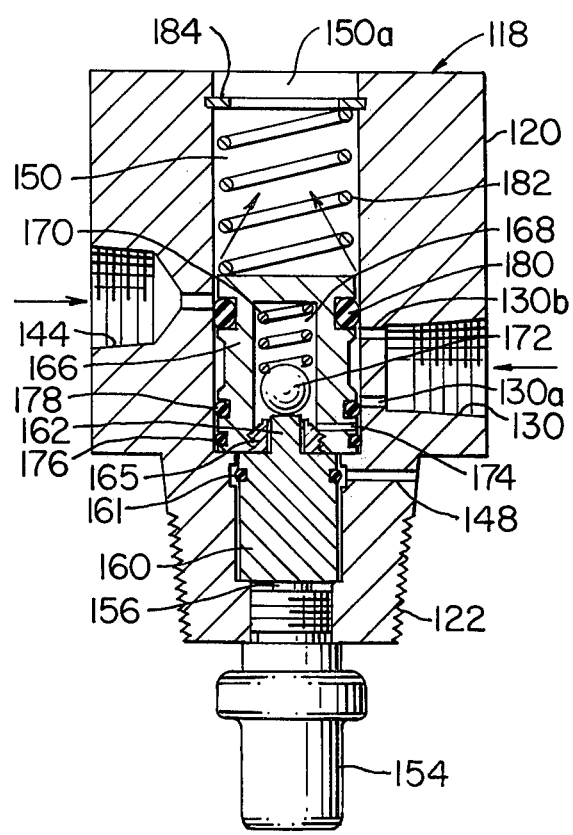
FIG. 11 is a sectional view, similar to FIGS. 7-10, showing the elements of the device returned to the same position as illustrated in FIG. 7.

When the movable valve member 166 is moved to the position thereof shown in FIG. 11, communication between the inlet passage 130 and the outlet passage 144 is closed. Also, the sealing member 180 of the movable valve member 166 is moved to a position in which there is open communication between the outlet passage 144 and the main passage 150. Thus, fluid under pressure from the mechanism operated thereby flows into the main passage 150 from the outlet passage 144 as illustrated in FIG. 11. The fluid is vented from the housing 120 through the main passage 150 and outwardly from the open end 150a, as illustrated in FIG. 11. Thus, a fluid operable mechanism which was actuated in snap action by fluid flowing thereto through the passage 144 is deactuated in a snap action manner as the movable valve member 166 moves in a snap action manner from the position thereof shown in FIG. 10 to the position thereof shown in FIG. 11.

Thus, it is understood that a thermally responsive fluid control valve device of this invention which includes a relatively slow acting thermally responsive actuator closes and opens fluid ports in a snap action manner. Thus, fluid operable mechanisms operated by fluid flow controlled by a thermally responsive fluid control valve device of this invention is capable of snap action.

Although the preferred embodiment of the snap action thermally responsive fluid control valve of this invention has been described, it will be understood that within the purview of this invention various changes may be made in the form, details, proportion and arrangement of parts, the combination thereof, and the mode of operation, which generally stated consist in a snap-action thermally responsive fluid control valve within the scope of the appended claims.

The invention having thus been described, the following is claimed:

1. Thermally responsive fluid control valve apparatus comprising:
   a housing provided with an elongate main passage therewithin, with an inlet passage, an outlet passage, and a vent passage leading to the main passage,
   a first movable valve member within the main passage,
   a second movable valve member within the main passage,
   the first and second movable valve members being relatively linearly movable within the main passage,
   the first movable valve member being linearly movable to a position which provides communication between the inlet passage and the outlet passage, the first movable valve member being linearly movable to a position which closes communication between the outlet passage and the inlet passage, the second movable valve member being linearly movable to a position which closes communication between the vent passage and the main passage, the second movable valve member being linearly movable to a position in which communication between the main passage and the vent passage is open,
   the first movable valve member having a cavity therein with an opening leading to the cavity, the opening providing communication from the cavity to a position between the first movable valve member and the second movable valve member, the second movable valve member having a protuberance extending into the cavity of the first movable valve member,
   a closure member within the cavity of the first movable valve member and engageable with the protuberance and movable to close the opening in the cavity to close communication between the cavity and the position between the first movable valve member and the second movable valve member,
   the first movable valve member having a flow passage leading from the main passage to the cavity therein, the first movable valve member being movable to a position in which there is communication between the inlet passage of the housing and the flow passage of the first movable valve member, the first movable valve member being movable to a position in which communication is closed between the inlet passage and the flow passage of the first movable valve member,
   thermally responsive actuator means having a portion exterior of the housing and a portion within the main passage of the housing, the portion within the main passage being engageable with the second movable valve member for linear movement thereof.

2. A thermally responsive fluid control valve device comprising:
   a housing provided with an elongate main passage, the housing also having an inlet passage, an outlet passage and a vent passage leading to the main passage,
   a first movable valve member within the main passage and movable therealong,
   a second movable valve member within the main passage and movable therealong,
   the first and second movable valve members being relatively movable along a common line,
   a thermally responsive actuator member having an actuator portion within the main passage and engageable with the second movable valve member for axial movement thereof toward the first movable valve member,
   resilient means within the main passage engaging the first movable valve member and urging the first movable valve member toward the second movable valve member,
   the first movable valve member having a flow passage therethrough for providing communication to a position between the movable valve members, a closure member for closing the flow passage through the first movable valve member,
   the second movable valve member having a portion engageable with the closure member of the first movable valve member for operation thereof,
   the first movable valve member being movable to a position providing communication between the inlet passage and the outlet passage, the first movable valve member being movable to a position to close communication between the inlet passage and the outlet passage, the first movable valve member being movable to a position in which there is communication between the inlet passage and the flow passage of the first movable valve member, the second movable valve member being movable to a position to provide communication between the vent passage and the main passage, the second movable valve member being movable to a position to close communication between the vent passage and the main passage, the first movable valve member being movable in a direction from the second movable valve member by fluid located between the first movable valve member and the second movable valve member.

3. A thermally responsive fluid control valve device comprising:
  a housing provided with a main passage therein and with an inlet passage and an outlet passage leading to the main passage,
  a thermally responsive actuator member having a first portion within the main passage and a second portion exterior of the housing,
  a first movable valve member within the main passage and positioned between the inlet passage and the outlet passage, the first movable valve member being movable to a position to provide communication between the inlet passage and the outlet passage, the first movable valve member being movable to a position to close communication between the inlet passage and the outlet passage,
  a second movable valve member, the second movable valve member being positioned between the first portion of the actuator member and the first movable valve member, the second movable valve member being engageable by the first portion of the actuator member for movement thereby, there being passage means for flow of fluid from the inlet passage to a position between the first valve member and the second valve member for flow of fluid between the valve members for relative movement between said valve members.

4. Thermally responsive fluid control valve apparatus comprising:
  a housing provided with an inlet passage and an outlet passage,
  valve means between the inlet passage and the outlet passage, the valve means having relatively movable parts and having a first condition and a second condition, the valve means in the first condition providing fluid communication from the inlet passage to a position between the relatively movable parts for flow of fluid to a position between the relatively movable parts for movement between the relatively movable parts and for operation of the valve means to the second condition thereof for controlling communication between the inlet passage and the outlet passage, one of the relatively movable parts including a valve member therewithin controlling flow of fluid between the relatively movable parts,
  thermally responsive actuator means operable upon the valve means for operation of the valve means to the first condition, the thermally responsive valve means having a movable actuator portion within the housing and a temperature sensing portion exterior of the housing.

5. Thermally responsive valve apparatus comprising:
  a housing provided with a main passage, with an inlet passage and an outlet passage leading to the main passage, there also being a vent passage leading to the main passage,
  a first movable valve member within the main passage and having a first position providing communication between the inlet passage and the outlet passage and having a second position closing communication between the inlet passage and the outlet passage, the first position of the first movable valve member being a normal deactuated condition thereof,
  a second movable valve member, the second movable valve member being movable to a first position providing communication between the main passage and the vent passage, the second movable valve member being movable to a second position to close communication between the main passage and the vent passage, the first position of the second movable valve member being the normal deactuated condition thereof,
  a thermally responsive actuator member having a portion engageable with the second movable valve member for movement thereof from the first position thereof to the second position thereof,
  the second position of the second movable valve member being such that there is fluid communication between the inlet passage and a position between the first and second movable valve members, fluid flow between the first and second movable valve members forcing movement of the first movable valve member to its second position.

6. Thermally responsive fluid control valve apparatus comprising:
  a housing provided with a main passage, there being an inlet passage and an outlet passage and a vent passage leading to the main passage,
  a first movable valve member within the main passage, the first movable valve member having a first position which closes communication between the inlet passage and the outlet passage, the first movable valve member having a second position which provides communication between the inlet passage and the outlet passage, the first movable valve member having the first position as a normal deactuated position, the first movable valve member also having an intermediate position between the first position thereof and the second position thereof,
  a second movable valve member within the main passage, the second movable valve member having a first position which provides communication between the vent passage and the main passage, the second movable valve member having a second position which closes communication between the main passage and the vent passage, the second movable valve member having the first position thereof as a normal deactuated position, the second movable valve member in a normal deactuated position being in engagement with the first movable valve member,
  a thermally responsive actuator member having a portion engageable with the second movable valve member for movement thereof from the first position theref to the second position thereof, the second movable valve member being between the actuator member and the first movable valve member, resilient means urging the first movable valve member toward the second movable valve member, the first movable valve member having a fluid port leading to a position between the first movable valve member and the second movable valve member, the second movable valve member moving the first movable valve from the first position thereof to the intermediate position thereof when the second movable valve member is moved from the first position thereof to the second position thereof, the fluid port of the first movable valve member being in communication with the inlet passage when the first movable valve member is in the intermediate position thereof for flow of fluid from the inlet passage through the fluid port to a position between the first and second movable valve members, flow of fluid to a position between the first and second movable valve members moving the first movable valve member in a direction from the second movable valve member and from the intermediate position of the first movable valve member to the second position thereof.

7. The thermally responsive fluid control valve apparatus of claim 6 which includes valve means for closing the fluid port, the valve means being operable with relative movement between the first and second movable valve members.

* * * * *